United States Patent
Wang et al.

(10) Patent No.: US 7,502,507 B2
(45) Date of Patent: Mar. 10, 2009

(54) ACTIVE EMBEDDED INTERACTION CODE

(75) Inventors: Jian Wang, Beijing (CN); Qiang Wang, Beijing (CN); Chunhui Zhang, Beijing (CN); Yue Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 671 days.

(21) Appl. No.: 10/284,412

(22) Filed: Oct. 31, 2002

(65) Prior Publication Data

US 2004/0086181 A1    May 6, 2004

(51) Int. Cl.
*G06K 9/18* (2006.01)
*G09G 5/08* (2006.01)

(52) U.S. Cl. .................................. 382/182; 345/158
(58) Field of Classification Search ............... 382/232, 382/182
See application file for complete search history.

(56) References Cited

U.S. PATENT DOCUMENTS

| | | | |
|---|---|---|---|
| 4,742,558 A | 5/1988 | Ishibashi et al. | |
| 4,745,269 A | 5/1988 | Van Gils et al. | |
| 5,051,736 A | 9/1991 | Bennett et al. | |
| 5,073,966 A * | 12/1991 | Sato | 382/237 |
| 5,073,996 A | 12/1991 | Schinle | |
| 5,247,137 A | 9/1993 | Epperson | |
| 5,288,986 A | 2/1994 | Pine et al. | |
| 5,294,792 A | 3/1994 | Lewis et al. | |
| 5,365,598 A | 11/1994 | Sklarew | |
| 5,442,147 A | 8/1995 | Burns et al. | |
| 5,448,372 A * | 9/1995 | Axman et al. | 386/124 |
| 5,587,558 A | 12/1996 | Matsushima | |
| 5,612,524 A | 3/1997 | Sant'Anselmo et al. | |
| 5,644,652 A | 7/1997 | Bellegarda et al. | |
| 5,652,412 A | 7/1997 | Lazzouni et al. | |
| 5,661,506 A | 8/1997 | Lazzouni et al. | |
| 5,686,718 A | 11/1997 | Iawi et al. | |
| 5,726,435 A | 3/1998 | Hara et al. | |
| 5,817,992 A | 10/1998 | D, Antonio | |
| 5,822,465 A | 10/1998 | Normile et al. | |

(Continued)

FOREIGN PATENT DOCUMENTS

CN    1352778    6/2002

(Continued)

OTHER PUBLICATIONS

Dey, et al., "A Fast Algorithm for Computing the Euler Number of an Image and its VLSI Implementation", IEEE; 13th International Conference on VLSI Design (Jan. 2003).

(Continued)

*Primary Examiner*—Jingge Wu
*Assistant Examiner*—Hadi Akhavannik
(74) *Attorney, Agent, or Firm*—Lee & Hayes, PLLC (57) ABSTRACT

A system and method is described for providing an encoding scheme for a bit stream and displaying or printing the encoded bit stream. Using the encoded bit stream, a pen with a camera may capture an image of a portion of the encoded bit stream. The captured image may then be decoded to provide an indication of the location of the image in relation to the encoded bit stream. The encoding scheme includes information regarding orientation, thus making decoding easier.

19 Claims, 9 Drawing Sheets

U.S. PATENT DOCUMENTS

| | | | |
|---|---|---|---|
| 5,825,015 | A | 10/1998 | Chan et al. |
| 5,852,434 | A | 12/1998 | Sekendur |
| 5,855,483 | A | 1/1999 | Collins et al. |
| 5,898,166 | A | 4/1999 | Fukuda et al. |
| 5,902,968 | A | 5/1999 | Sato et al. |
| 5,937,110 | A | 8/1999 | Petrie et al. |
| 5,960,124 | A | 9/1999 | Taguchi et al. |
| 6,005,973 | A | 12/1999 | Seybold et al. |
| 6,044,165 | A | 3/2000 | Perona et al. |
| 6,052,481 | A | 4/2000 | Grajski et al. |
| 6,076,734 | A | 6/2000 | Dougherty et al. |
| 6,081,261 | A | 6/2000 | Wolff et al. |
| 6,098,882 | A * | 8/2000 | Antognini et al. ........... 235/454 |
| 6,141,014 | A | 10/2000 | Endo et al. |
| 6,208,771 | B1 * | 3/2001 | Jared et al. .................. 382/306 |
| 6,226,636 | B1 | 5/2001 | Mohamed et al. |
| 6,243,071 | B1 | 6/2001 | Shwarts et al. |
| 6,249,614 | B1 * | 6/2001 | Kolesnik et al. ............ 382/251 |
| 6,278,968 | B1 | 8/2001 | Franz et al. |
| 6,479,768 | B1 | 11/2002 | How |
| 6,546,136 | B1 * | 4/2003 | Hull ........................... 382/209 |
| 6,577,299 | B1 | 6/2003 | Schiller et al. |
| 6,585,154 | B1 | 7/2003 | Ostrover et al. |
| 6,665,490 | B2 * | 12/2003 | Copperman et al. ........... 386/95 |
| 6,741,746 | B2 * | 5/2004 | Epstein et al. ............... 382/233 |
| 6,744,967 | B2 | 6/2004 | Kaminski et al. |
| 6,752,317 | B2 | 6/2004 | Dymetman et al. |
| 6,870,966 | B1 | 3/2005 | Silverbrook |
| 7,225,402 | B2 * | 5/2007 | Silverbrook et al. ........ 715/541 |
| 2001/0023896 | A1 | 9/2001 | He et al. |
| 2001/0038383 | A1 * | 11/2001 | Ericson et al. ............... 345/173 |
| 2001/0038711 | A1 | 11/2001 | Williams |
| 2001/0050308 | A1 * | 12/2001 | Paul et al. ................... 235/375 |
| 2002/0000981 | A1 | 1/2002 | Hugosson et al. |
| 2002/0011989 | A1 * | 1/2002 | Ericson et al. ............... 345/158 |
| 2002/0020750 | A1 | 2/2002 | Dymetman et al. |
| 2002/0048404 | A1 | 4/2002 | Fahraeus et al. |
| 2002/0071488 | A1 * | 6/2002 | Kim et al. .............. 375/240.03 |
| 2002/0148655 | A1 | 10/2002 | Cho et al. |
| 2002/0163510 | A1 | 11/2002 | Williams et al. |
| 2002/0163511 | A1 | 11/2002 | Sekendur |
| 2003/0063045 | A1 | 4/2003 | Fleming |
| 2003/0063072 | A1 | 4/2003 | Brandenberg et al. |
| 2004/0032393 | A1 | 2/2004 | Brandenberg et al. |

FOREIGN PATENT DOCUMENTS

| | | |
|---|---|---|
| EP | 0 407 734 | 1/1991 |
| EP | 0407734 | 1/1991 |
| EP | 0439682 | 8/1991 |
| EP | 0 564 708 A | 10/1993 |
| EP | 0 694 870 A | 1/1996 |
| EP | 0 732 666 | 9/1996 |
| EP | 0 865 166 | 9/1998 |
| EP | 1 158 456 | 11/2001 |
| WO | WO 96/30217 A | 10/1996 |
| WO | WO 00/25293 | 5/2000 |
| WO | 0073983 | 12/2000 |
| WO | WO 01/48685 | 7/2001 |
| WO | WO 01/71654 | 9/2001 |
| WO | WO 02/077870 | 10/2002 |

OTHER PUBLICATIONS

European Search Report, Application No. 03021238.5-1527; Dated Jun. 1, 2005, Total pp. (6).

Fujieda et al., "*Development Of Pen-Shaped Scanners*", Nec, vol. 51, No. 10, 1998.

Crowley et al., "*Things That See*", Communications of the A.C.M., vol. 43, No. 3, pp. 54-64, Mar. 2000.

Sato et al., "*Video Tablet—2D Coordinate Input Device With OCD Camera*", Osaka University, vol. J67-D, No. 6, Jun. 1984.

Okaka et al., "*A High-Resolution Handwriting Character Input Device Using Laser Beams*", Department of Instrumentation Engineering, Faculty of Science and Technology, vol. 10.4, No. 11.1, 1981.

Ko et al., "*Finger Mouse and Gesture Recognition System As A new Human computer Interface*", Computer and Graphics, col. 21, No. 5, pp. 555-561, 1997.

Champaneria, "*PADCAM: A Real-Time, Human-Centric Notetaking System*", MIT Laboratory for Computer Science, Mar. 2002.

OTM Technologies, "*VPEN—Revolutionizing Human Interaction With The Digital World™* ", pp. 1-6.

Internet Print Out: "*N-Scribe For Digital Writing*", Mobileinfo.com, New issue #2001—15 (Apr. 2001), http://www.mobileinfo.com/News_2001/Issue15/Digital-nscribe.htm, dated Jul. 15, 2002.

Internet Print Out: "*Don't Break This Ink Pen*", Edgereview.com, by Brian Urbanski, http://www.edgereview.com/ataglance.cfm?category=edge&ID=180, dated Jul. 15, 2002.

Internet Print Out: "*DataGlyphs® ; Embedding Digital Data*", Parc Solutions, http://www.parc.com/solutions/dataglyphs/, dated Jul. 15, 2002.

Internet Print Out: "*Navilite—Optical Opportunities—Bluetooth-enabled optical transition measurement technology paves the way for an untethered stylus that can write on any surface*", vol. 8, Issue No. 34, Jul. 5-11, 2002, www.computerworld.com, dated Aug. 15, 2002.

Internet Print Out: "*Competitive Technologies' Investee Introduces N-Scribe Pen—Digital Ink Presents Wireless Pen At Demo 2001*", Competitive Technologies, http://www.competitivetech, dated Sep. 5, 2003.

Internet Print Out: "N-Scribe For Digital Writing", Flash Commerce News, http://flashcommerce.com/articles/, dated Sep. 5, 2003.

Internet Print Out: "*The Hot New Medium: Paper—How The Oldest Interface In The Book Is Redrawing The Map Of The Networked World*", http://www.wired.com/wired/, dated Sep. 5, 2003.

Internet Print Out: "*Maxell Digital Pen To Use Anoto System*", Gizmo, http://www.gizmo.com.au/, dated Sep. 5, 2003.

Internet Print Out: "*Anoto Pen Bluetooth*", Tabletpccorner, http://www.tabletpccorner.net, dated Sep. 5, 2003.

Internet Print Out: "*Jot This—Nscribe Pen*", PC Magazine, http://www.pcmag.com/article2/0,4149,31650,00.asp, dated Jul, 15, 2002.

Internet Print Out: "*Jot This—Nscribe Pen*", PC Magazine, http://www.pcmag.com/article2/0,4149,31650,00.asp, dated Sep. 5, 2003.

Internet Print Out: "*RF Pen Sends Your Scribbles*", Appliance Manufacturing Magazine, http://www.ammagazine.com. Dated Sep. 26, 2002.

Internet Print Out: "Nscribe pen And Presenter-To-Go—Infrared Pen And New Springboard Module Make Their Debut At Demo 2001", Edgereview.com, by Brian Urbanski, http://www.techtv.com/freshgear/pr, dated Sep. 5, 2003.

Internet Print Out: "*Dont't Break This Ink Pen*", Edgereview.com, by Brian Urbanski, http://www.edgereview, com/ataglance.cfm?category=edge&ID=180, dated Sep. 5, 2003.

Internet Print Out: "*Preprocessing in the Npen ++ System*", http://www.is.cs.cmu.edu/mie/multimodal_npen_preproc.html, dated Aug. 8, 2002.

Internet Print Out: "*OTM Technologies—V Pen*", searched http://www.otmtech.com/vpen3.asp, pp. 1-7.

Internet Print Out: "*Mimio—Products*", Mimio, http://www.mimio.com, pp. 1-8.

Internet Print Out: "*SMART Board Interactive Whiteboard*", Smarttech, http://www.smarttech.com, pp. 1-26.

Haynes, "*Wacom PL-500*", www.wacom.co.uk.

Internet Print Out: "*(Electro-Magnetic Resonance) send and position sensing technology*" Wacom, Technology, http://www.wacom-components.com/tech.asp, pp. 1-6.

Internet Print Out: "*Cordless Batteryless Pen*", Wacom Penabled, Components, http://www.wacom.com/components/index.cfm, dated Jul. 15, 2002.

Internet Print Out: "*PL-500—15.1 inch Screen Digital LCD Pen Tablet System*", Wacom Graphics Tablet Solution, http://ap.wacm.co.jp/products/pl/contents/pl500.html, pp. 1-13.

Internet Print Out: Digital Pens, http://www.anotofunctionality.com/navigate.asp?PageID=96, pp. 1-70.

Lau, R., "Adapative Statistical Language Modeling", Submitted to the Dept. of Electrical Engineering and Computer Science in Partial Fulfillment for the Degree of Master of Science at the MIT, May 1994.

European Office Action dated Mar. 10, 2006 from European Patent Application No. 03021238.5-1527.

K. S. Nathan, J. R. Bellegarda, D. Nahamoo, and E. J. Bellegarda, "On-Line Handwriting Recognition Using Continuous Parameter Hidden Markov Models," 1993 IEEE.

M.E. Munich, Perona, "Visual Input for Pen-Based Computers," 2002 IEEE.

Kai-Fu Lee, "Automatic Speech Recognition—The Development of the SPHINX System", Kluwer Academic Publishers, pp. 1-207, 1992.

Frederick Jelinek, "Statiscal Methods for Speech Recognition", The MIT Press, pp. 1-283, 2001.

Dumer et al., "Hardness of Approximating the Minimum Distance of a Linear Code", IEEE, pp. 475-484, 1999.

Clark et al., "Maximal and Near-Maximal Shift Register Sequences: Efficient Event Counters and Easy Discrete Logarithms", IEEE Transactions on Computers, vol. 43, No. 5, May 1994.

Grasso et al., "Augmenting Recommender Systems by Embedding Interfaces into Practices", pp. 267-275, 1999.

Moran et al., "Design and Technology for Collaborage: Collaborative Collages of Information on Physical Walls", Nov. 1999.

\* cited by examiner

$$o = \theta + \begin{cases} 0 - no\ a \\ \dfrac{\pi}{2} - no\ b \\ \pi - no\ c \\ \dfrac{3\pi}{2} - no\ d \end{cases}$$

ACTIVE EMBEDDED INTERACTION CODE

TECHNICAL FIELD

The present invention relates to interacting with a medium using a digital pen. More particularly, the present invention relates to determining the location of a digital pen during interaction with one or more surfaces.

BACKGROUND

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user. One of the difficulties, however, with having a printed document with annotations is the later need to have the annotations entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations is needed.

Figure 10:
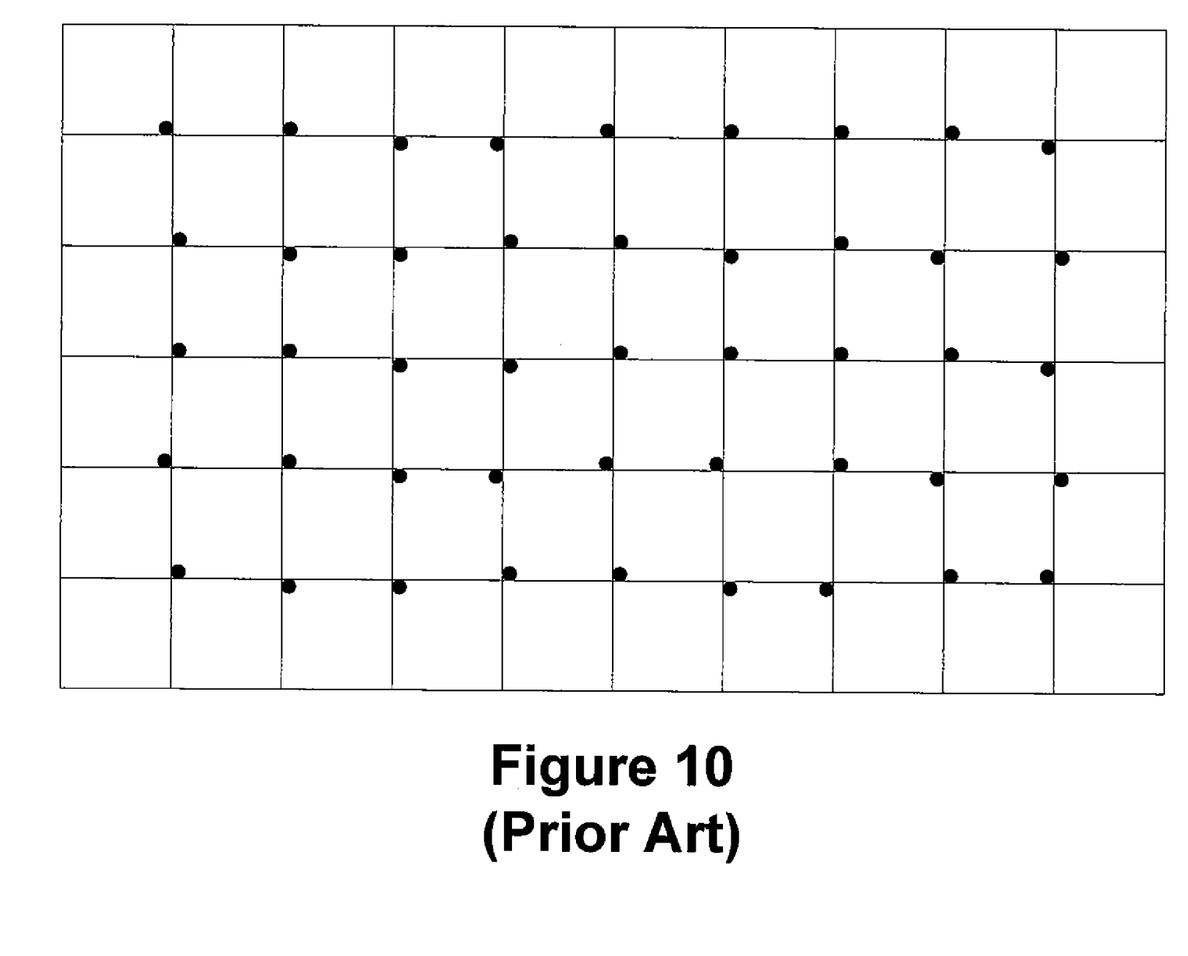
FIG. 10 shows a conventional scheme for encoding space in a document.

One image pattern is shown in FIG. 10. This pattern is used by the Anoto pen (by Anoto Inc.) to determine a location of a pen on a piece of paper. The pattern as shown in FIG. 10 is difficult to easily orient from any portion and determine the accurate rotation of the pattern. If the determination of the rotation is based on the decoding of the pattern itself to find information encoded in the data stream, this determination requires significant processing for decoding the data stream itself to determine the proper orientation of the pattern. This labor-intensive decoding approach impedes quick adoption of the pattern, as it requires substantial hardware resources just to locate a captured portion of the image. Scaling of the use of the pattern beyond a short note becomes difficult (for example, composing a large document by handwriting only) as each camera image relating to an ink stroke may need to be completely processed in all orientations to determine the proper orientation of the pattern. An improved pattern is needed to represent data streams.

SUMMARY

Aspects of the present invention provide solutions to at least one of the issues mentioned above, thereby enabling one to locate a position or positions on a viewed image. The viewed image may be on printed paper or may be on a displayed computer image. Aspects of the present invention include an encoding pattern represented by rows and columns of dark images. The images may be solid over a row or column, may alternate in the rows or columns, may alternate over many rows or columns, and variations thereof.

These and other aspects of the present invention will become known through the following drawings and associated description.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

Aspects of the present invention relate to determining the location of a captured image in relation to a larger image. The location determination method and system described herein may be used in combination with a multi-function pen.

The following is separated by subheadings four of the reader. The subheadings include: terms, general-purpose computer, image capturing pen, bit representations, representation analysis, location determination, data stream encoding, and applications.

Terms

Pen—any writing implement that may or may not include the ability to store ink. In some examples, a stylus with no ink capability may be used as a pen in accordance with embodiments of the present invention.

Camera—an image capture system.

General Purpose Computer

Figure 1:
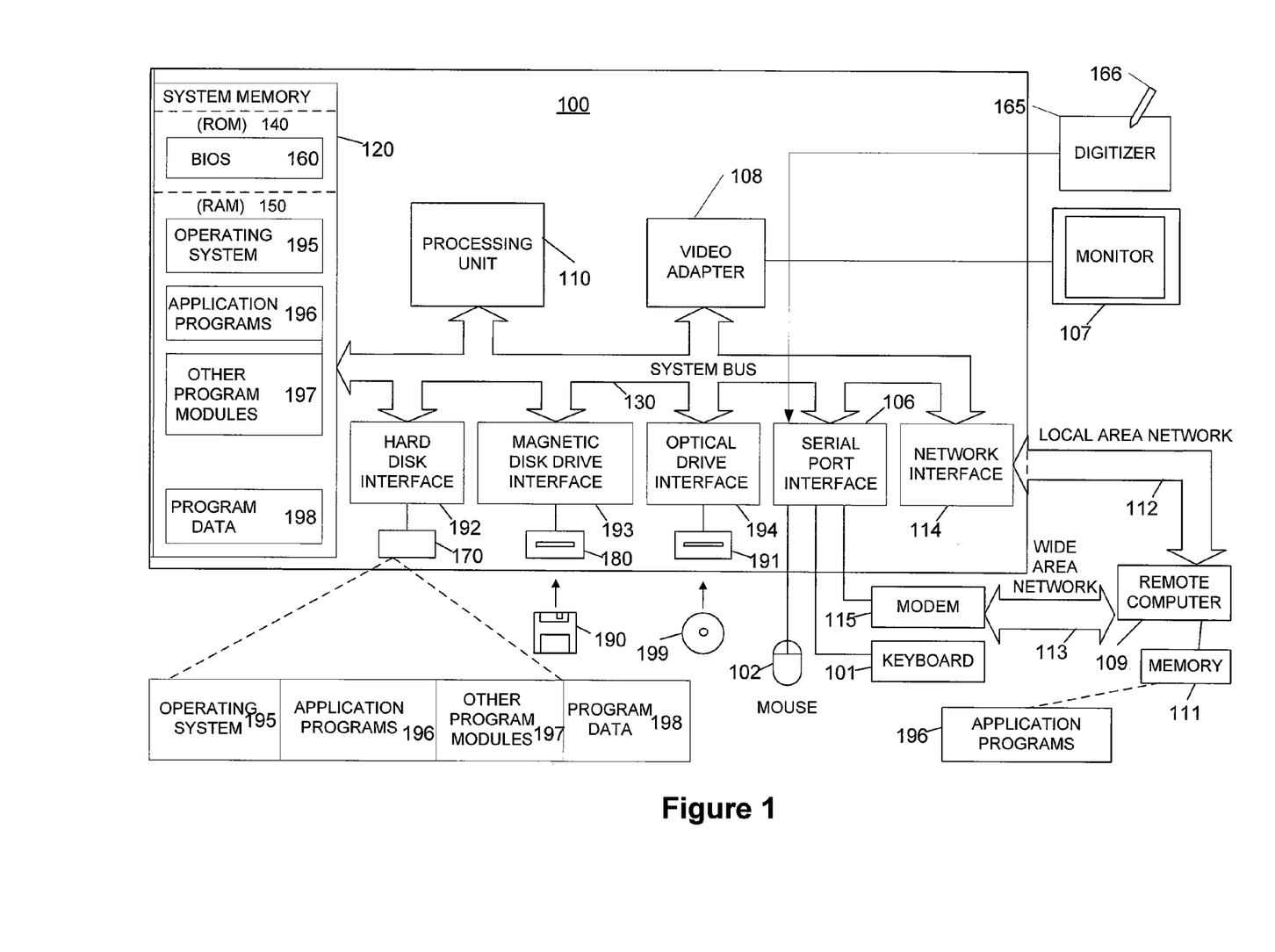
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 199 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form. The displayed form may be printed paper (or other physical medium) or may be a display projecting the encoded data stream in conjunction with another image or set of images. For example, the encoded data stream may be represented as a physical image on the paper or an image overlying the displayed image or may be a physical encoded pattern (non-modifiable pattern) combined with or overlaying a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing the location of the camera, the system can track movement of the stylus being controlled by the user.

Figures 6A, 6B:
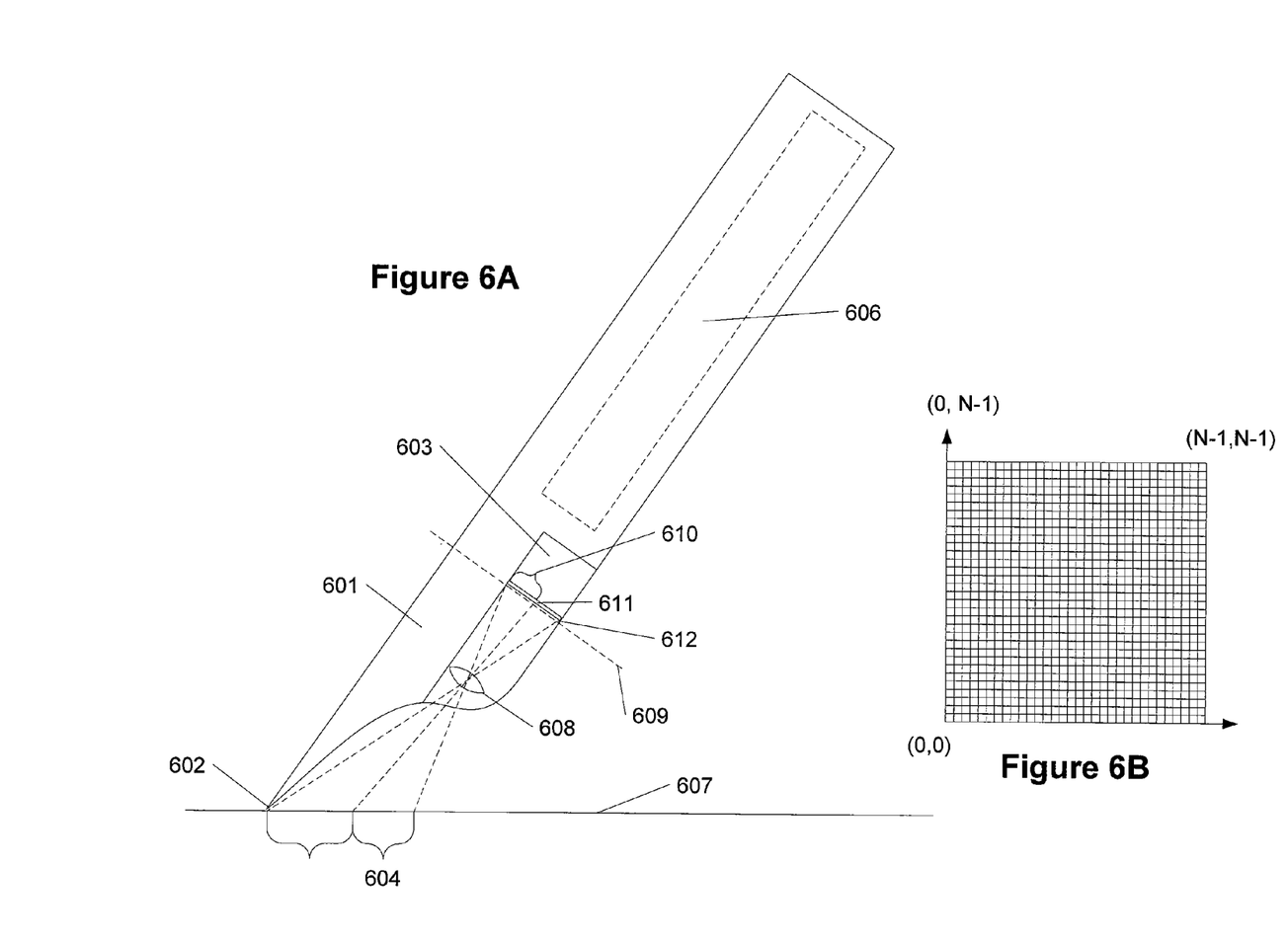
FIGS. 6A and 6B show an image capture system and corresponding captured image in accordance with embodiments of the present invention.

FIGS. 6A and 6B show an illustrative example of pen 601 with a camera 603. Pen 601 includes a tip 602 that may or may not include an ink reservoir. Camera 603 captures an image 604 from surface 607. Pen 601 may further include additional sensors and/or processors as represented in broken box 606. These sensors and/or processors 606 may also include the ability to transmit information to another pen 601 and/or a personal computer (for example, via Bluetooth or other wireless protocols).

FIG. 6B represents an image as viewed by camera 603. In one illustrative example, the field of view of camera 603 is 32×32 pixels (where N=32). Accordingly, FIG. 6B shows a field of view of 32 pixels long by 32 pixels wide. The size of N is adjustable based on the degree of image resolution desired. Also, while the field of view of the camera 603 is shown as a square for illustrative purposes here, the field of view may include other shapes as is known in the art.

The input to the pen 601 from the camera 603 may be defined as a sequence of image frames $\{I_i\}$, i=1, 2, . . . , A, where $I_i$ is captured by the pen 601 at sampling time $t_i$. The sampling rate may be fixed or may be variable based on the size of the document. The size of the captured image frame may be large or small, depending on the size of the document and the degree of exactness required. Also, the camera image size may be determined based on the size of the document to be searched.

The image captured by camera 603 may be used directly by the processing system or may undergo pre-filtering. This pre-filtering may occur in pen 601 or may occur outside of pen 601 (for example, in a personal computer).

The image size of FIG. 6B is 32×32 pixels. If each encoding unit size is 3×3 pixels, then the number of captured encoded units would be approximately 100 units. If the encoding unit size is 5×5, then the number of captured encoded units is approximately 36.

FIG. 6A also shows the image plane 609 on which an image 610 of the pattern from location 604 is formed. Light received from the pattern on the object plane 607 is focused by lens 608. Lens 608 may be a single lens or a multi-part lens system, but is represented here as a single lens for simplicity. Image capturing sensor 611 captures the image 610.

The image sensor 611 may be large enough to capture the image 610. Alternatively, the image sensor 611 may be large enough to capture an image of the pen tip 602 at location 612. For reference, the image at location 612 is referred to as the virtual pen tip. It is noted that the virtual pen tip location with respect to image sensor 611 is fixed because of the constant relationship between the pen tip, the lens 608, and the image sensor 611. Because the transformation from the location of the virtual pen tip 612 (represented by $L_{virtual-pentip}$) to the location of the real pen tip 602 (represented by $L_{pentip}$), one can determine the location of the real pen tip in relation to a captured image 610.

The following transformation $F_{S \to P}$ transforms the image captured by camera to the real image on the paper:

$$L_{paper} = F_{S \to P}(L_{sensor})$$

During writing, the pen tip and the paper are on the same plane. Accordingly, the transformation from the virtual pen tip to the real pen tip is also $F_{S \to P}$:

$$L_{pentip} = F_{S \to P}(L_{virtual-pentip})$$

The transformation $F_{S \to P}$ may be referred to as a perspective transformation. This simplifies as:

$$F'_{S \to P} = \begin{Bmatrix} s_x \cos\theta, & s_y \sin\theta, & 0 \\ -s_x \sin\theta, & s_y \cos\theta, & 0 \\ 0, & 0, & 1 \end{Bmatrix}$$

as the estimation of $F_{S \to P}$, in which $\theta$, $s_x$, and $s_y$ are the rotation and scale of two orientations of the pattern captured at location 604. Further, one can refine $F'_{S \to P}$ to $F_{S \to P}$ by matching the captured image with the corresponding background image on paper. "Refine" means to get a more precise perspective matrix $F_{S \to P}$ (8 parameters) by a kind of optimization algorithm referred to as a recursive method. The recursive method treats the matrix $F'_{S \to P}$ as the initial value. $F_{S \to P}$ describes the transformation between S and P more precisely than $F'_{S \to P}$.

Next, one can determine the location of virtual pen tip by calibration.

One places the pen tip 602 on a known location $L_{pentip}$ on paper. Next, one tilts the pen, allowing the camera 603 to capture a series of images with different pen poses. For each image captured, one may receive the transform $F_{S \to P}$. From this transform, one can obtain the location of the virtual image of pen tip $L_{virtual-pentip}$:

$$L_{virtual-pentip} = F_{P \to S}(L_{pentip})$$

And, $$F_{P \to S} = 1/F_{S \to P}$$

By averaging the $L_{virtual-pentip}$ received from every image, an accurate location of the virtual pen tip $L_{virtual-pentip}$ may be determined.

The location of the virtual pen tip $L_{virtual-pentip}$ is now known. One can also obtain the transformation $F_{S \to P}$ from image captured. Finally, one can use this information to determine the location of the real pen tip $L_{pentip}$:

$$L_{pentip} = F_{S \to P}(L_{virtual-pentip})$$

Bit Representations

Figures 2A, 2B:
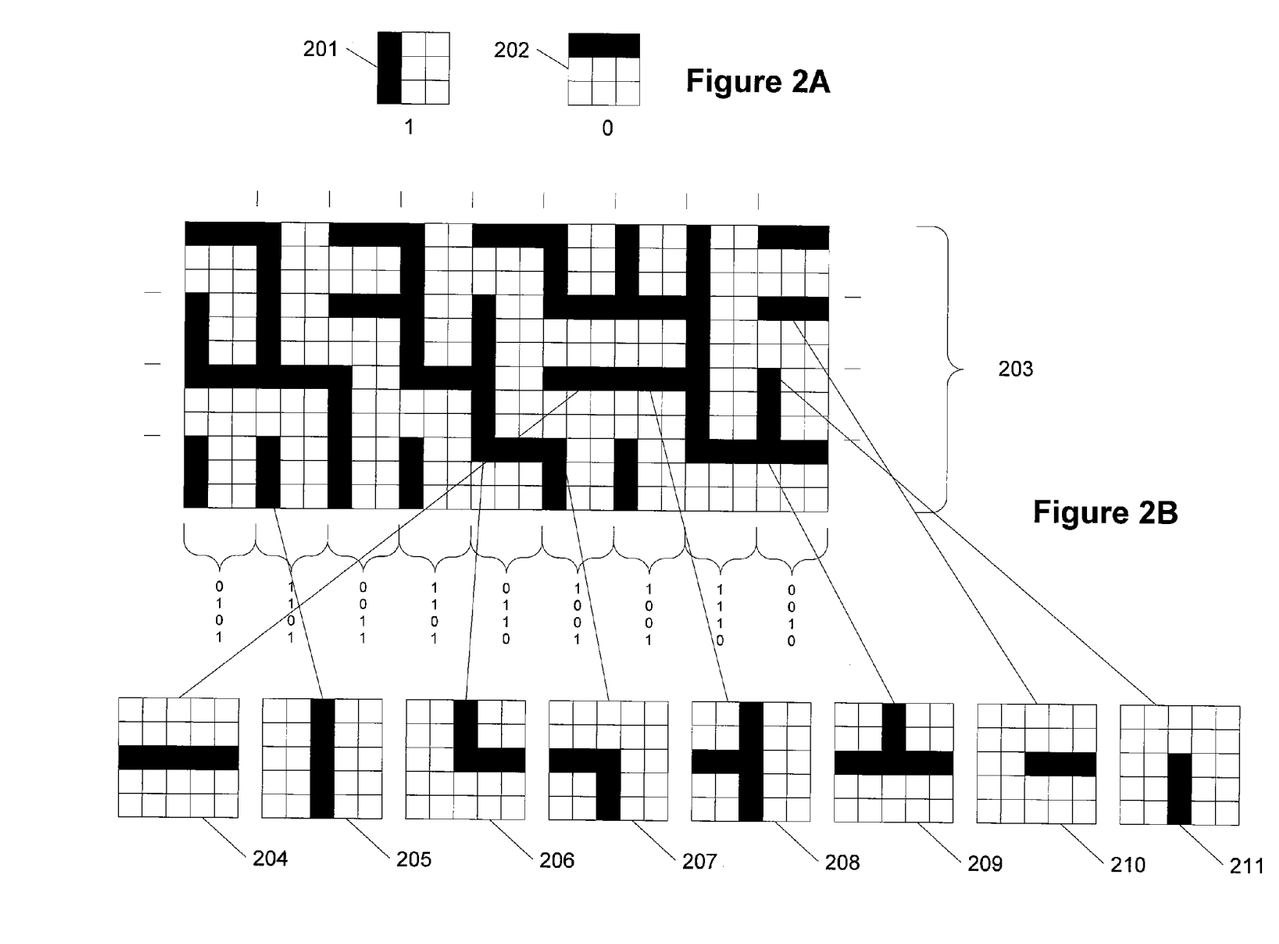
FIGS. 2A through 2E show various encoding systems in accordance with embodiments of the present invention.
Figure 2C:
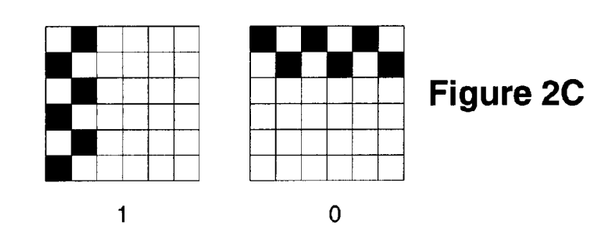
Figure 2D:
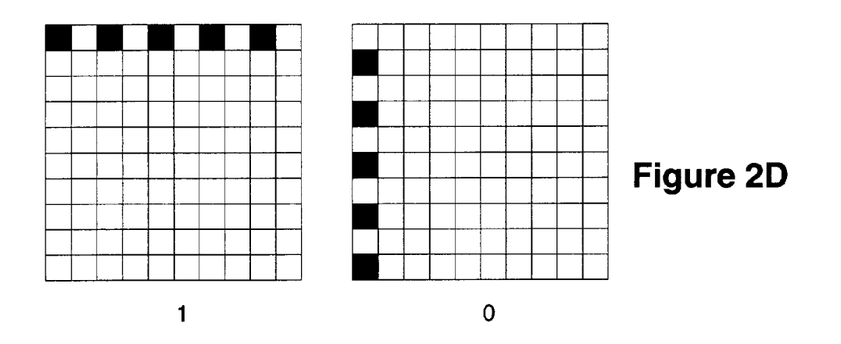
Figure 2E:
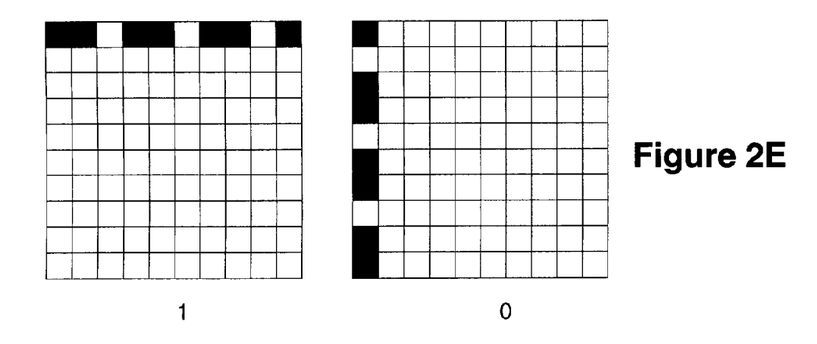

FIG. 2A shows sample encoding techniques for a first bit and a second bit. A first bit 201 (for example, "1") is represented by a column of dark ink. A second bit 202 (for example, "0") is represented by a row of dark ink. It is appreciated that any color ink may be used to represent the various bits. The only requirement in the color of the ink chosen is that it provides a significant contrast with the background of the medium to be differentiable by an image capture system. The bits in FIG. 2A are represented by a 3×3 matrix of cells. The size of the matrix may be modified to be any size as based on the size and resolution of an image capture system. Alternative representation of bits 0 and 1 are shown in FIGS. 2C-2E. It is appreciated that the representation of a one or a zero for the sample encodings of FIGS. 2A-2E may be switched without effect. FIG. 2C shows bit representations occupying two rows or columns in an interleaved arrangement. FIG. 2D shows an alternative arrangement of the pixels in rows and columns in a dashed form. Finally FIG. 2E show pixel representations in columns and rows in an irregular spacing format (e.g., two dark blocks followed by a light block).

Referring back to FIG. 2A, if a bit is represented by a 3 by 3 matrix and an imaging system detects a dark row and two white rows in the 3×3 region, then a zero is represented (or a one). If an image is detected with dark column and two white columns, then a one is represented (or a zero).

Here, more than one block or pixel or dot is used to represent a bit. Using a single pixel (or block or bit) to represent a bit is fragile. Dust, creases in paper, nonplanar surfaces, and the like create difficulties in reading single bit representations of data units.

A bit stream is used to create the graphical pattern 203 of FIG. 2B. Graphical pattern 203 includes 12 rows and 18 columns. The rows and columns are formed by a bit stream being converted into a graphical representation using bit representations 201 and 202. FIG. 2B may be viewed as having the following bit representation:

$$\begin{bmatrix} 0 & 1 & 0 & 1 & 0 & 1 & 1 & 1 & 0 \\ 1 & 1 & 0 & 1 & 1 & 0 & 0 & 1 & 0 \\ 0 & 0 & 1 & 0 & 1 & 0 & 0 & 1 & 1 \\ 1 & 1 & 1 & 1 & 0 & 1 & 1 & 0 & 0 \end{bmatrix}$$

Various bit streams may be used to create the image 203 shown in FIG. 2B. For example, a random or pseudo-random sequence of ones and zeros may be used. The bit sequence may be arranged in rows, in columns, diagonally, or following any other formulaic ordering. For example, the above matrix may be formed by the following bit stream if nm left to right then down:

0101 0111 0110 1100 1000 1010 0111 1110 1100.

The above matrix may be formed by the following bit stream if run top to bottom then right:

0101 1101 0011 1101 0110 1001 1001 1110 0010.

The above matrix may represent the following bit stream if run diagonally then wrapped:

0111 0000 0101 1101 1001 0111 1111 1000 1010.

Representation Analysis

FIG. 2B also includes representations of the pixel blocks from image 203. The displayed images 204-211 show 5×5 pixel blocks. Pixel block 204 shows a dark row between white rows. Pixel block 205 shows a dark column between white columns. Pixel block 206 shows a bottom left corner. Pixel block 207 shows a top right corner. The pixel block 208 shows a dark column with half a dark row on the left. Pixel block 209 shows a dark row with half a dark column above the row. The pixel block 210 shows half a dark row. Pixel block 211 shows half a dark column. Analyzing the combination of pixel blocks, one appreciates that all combinations of pixel may be formed by the image segments found in pixel blocks 204-211.

The pattern created in FIG. 2B may be referred to as a maze pattern in that the line segments form a maze, with no area being completely enclosed on all four sides by the maze.

Figure 3A:
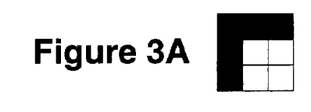
FIGS. 3A through 3D show four possible resultant corners associated with the encoding system according to FIGS. 2A and 2B.
Figure 3B:
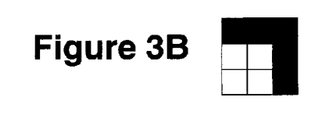
Figure 3C:
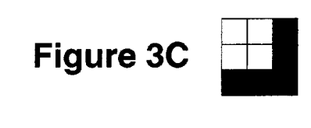
Figure 3D:
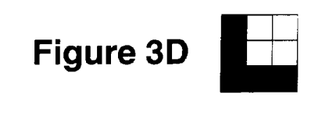

Further, one may attempt to represent all possible pixel combinations with a smaller set of pixel blocks. Without more, one would expect that each of the four blocks shown in FIGS. 3A-3D to be found in the image 203. However, only three types of corners exist in the eight pixel blocks 204-211. In this example, there is no pixel block represented as FIG. 3A. By the fact that the image segments 201 and 202 may be chosen to eliminate a type of corner, this presents the opportunity to determine the orientation of a captured image based on the missing type of corner.

Figure 4:
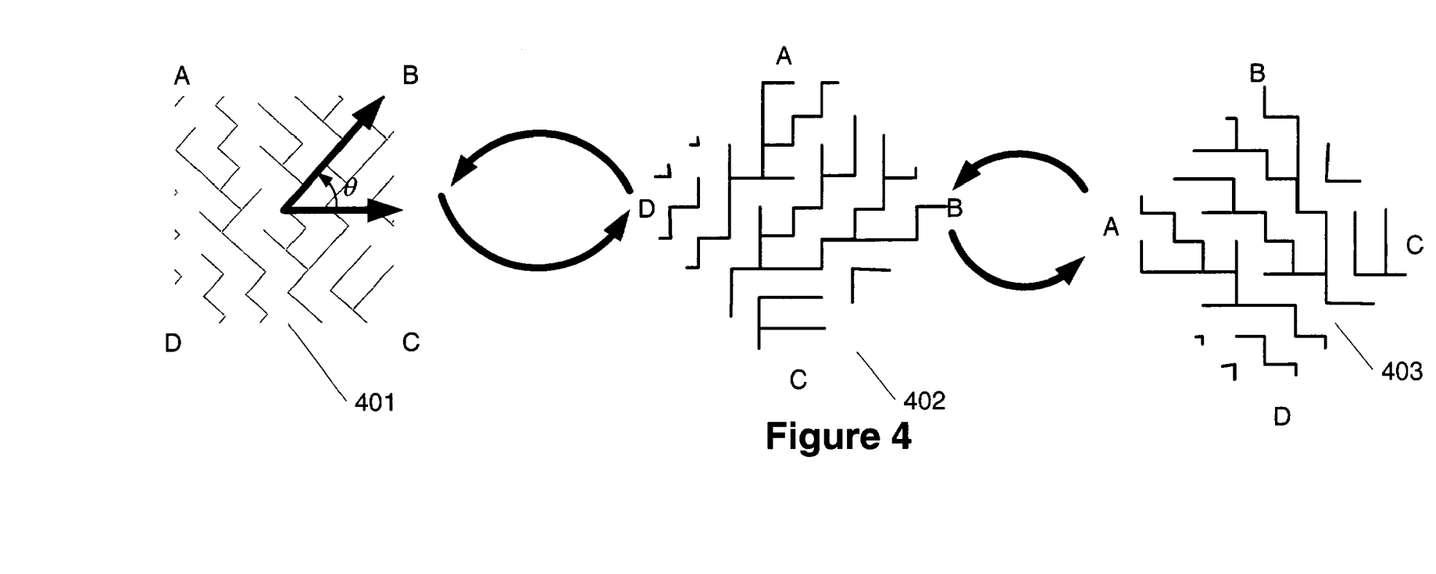
FIG. 4 shows rotation of a captured image portion in accordance with embodiments of the present invention.

Continuing to FIG. 4, the image as captured by a camera 401 may be analyzed and its orientation determined so as to be interpretable as to the position actually represented by the image 401. First, image 401 is reviewed to determine the angle $\theta$ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Figure 5:
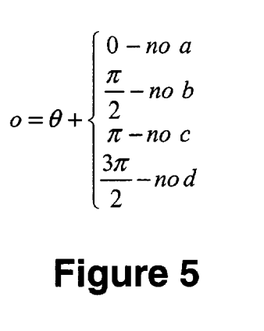
FIG. 5 shows various angles of rotation used in conjunction with the coding system of FIGS. 2A through 2E.

Next, image 401 is analyzed to determine which corner is missing. The rotation amount o needed to rotate image 401 to an image ready for decoding 403 is shown as o=($\theta$ plus a rotation amount {defined by which corner missing}). The rotation amount is shown by the equation in FIG. 5. Referring back to FIG. 4, angle $\theta$ is first determined by the layout of the pixels to arrive at a horizontal and vertical (or other predefined grid orientation) arrangement of the pixels and the image is rotated as shown in 402. An analysis is then conducted to determine the missing corner and the image 402 rotated to present the image as 403 to set up the image for decoding. Here, the image is rotated 90 degrees counterclockwise so location of image 403 may be recovered.

It is appreciated that the rotation angle $\theta$ may be applied before or after rotation of the image 401 to account for the missing corner.

Finally, the code in image 403 is read out and correlated with the original bit stream used to create image 203. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a hamming distance between the two bit streams. It is appreciated that a variety of approaches may be used to determine the location of the recovered bit stream within the original bit stream.

Location Determination

Figure 7:
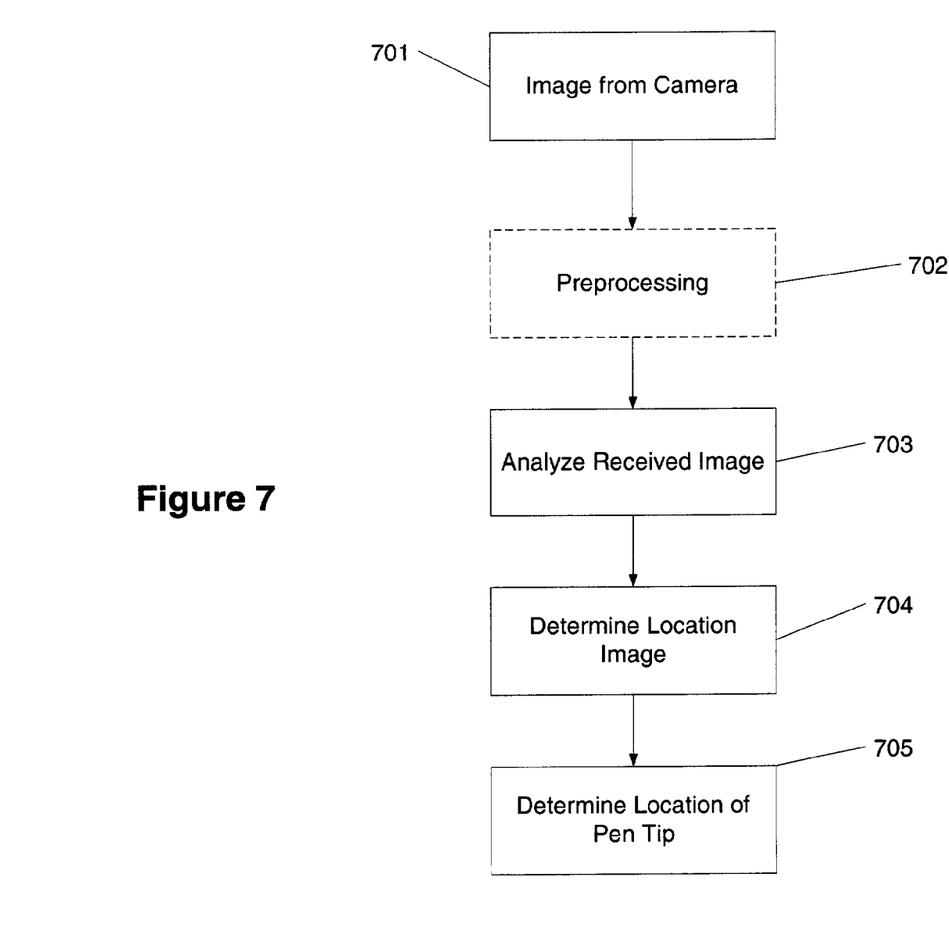
FIG. 7 shows a method for determining the location of a captured image in accordance with embodiments of the present invention.

FIG. 7 shows a process for determining the location of a pen tip. The input is an image captured by a camera and the output may be a position coordinate of the image compared with the total image. Also, the output may include (or not) a rotation angle of the captured image.

In step 701, an image is received from a camera. Next, the received image may be optionally preprocessed in step 702 (as shown by the broken outline of step 702) to adjust the contrast between the light and dark pixels, in an attempt to determine the rotation angle of the captured image, and the like.

Next, in step 703, the image is analyzed to determine the bit stream within it.

Next, in step 704, the bit stream is compared against the original bit stream and the location of the received bit stream within the original bit stream is determined. This comparison may be made when the system is aware of how the original bit stream is wrapped to create the image 203. Finally, once the location of the captured image has been determined in step 704, the location of the pen tip may be determined in step 705.

Figure 8:
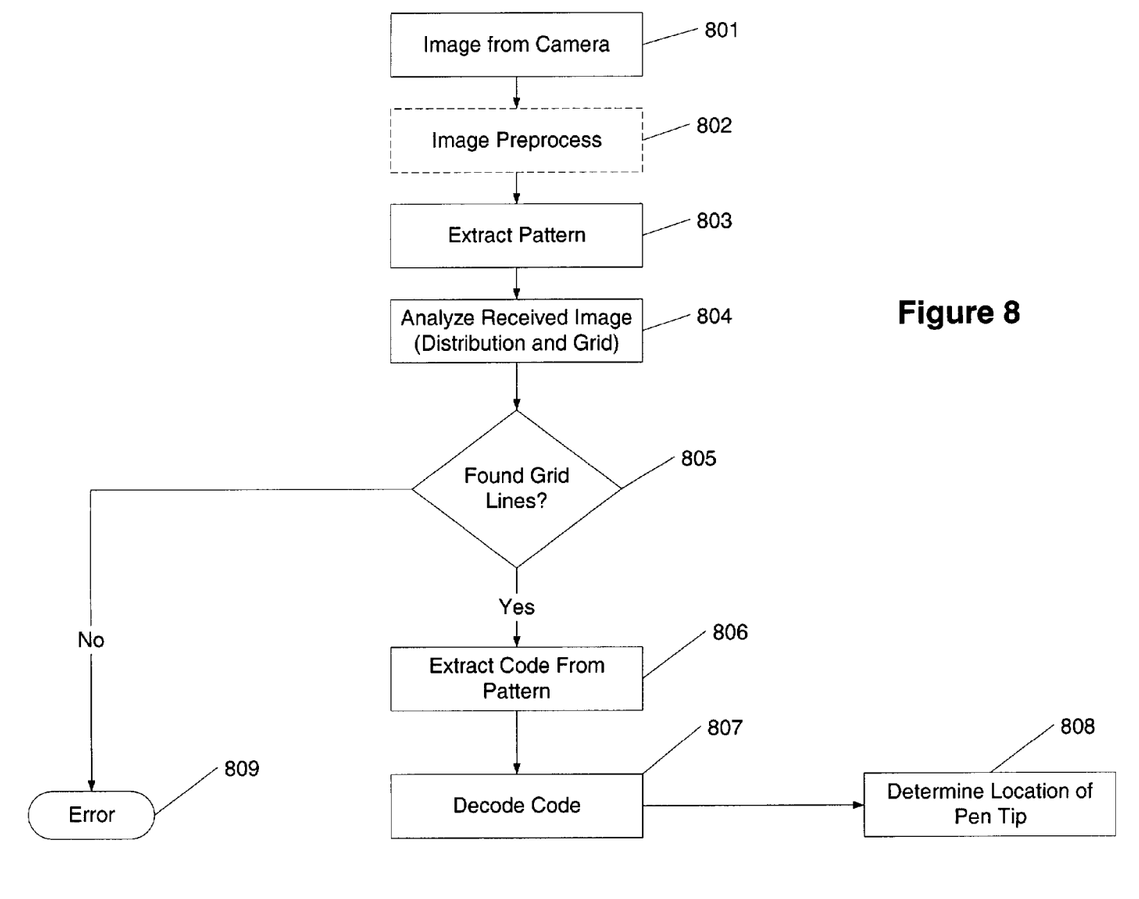
FIG. 8 shows the method for determining the location of captured image of FIG. 7 in greater detail in accordance with embodiments of the present invention.

FIG. 8 shows the approach of FIG. 7 in greater detail to determining the location of the pen tip. First, an image is received from the camera in step 801. The image then may optionally undergo image preprocessing in step 802 (as shown by the broken outline of step 802). The pattern is extracted in step 803. Here, pixels on the various lines may be extracted to find the orientation of the pattern and determine the angle $\theta$.

Next, the received image is analyzed in step 804 to determine the underlying distribution of pixels and grid lines. If grid lines are found in step 805, then the code is extracted from the pattern in step 806. The code is then decoded in step 807 and the location of the pen tip determined in step 808. If no grid lines were found in step 805, then an error is returned in step 809.

Data Stream Encoding

Figure 9:
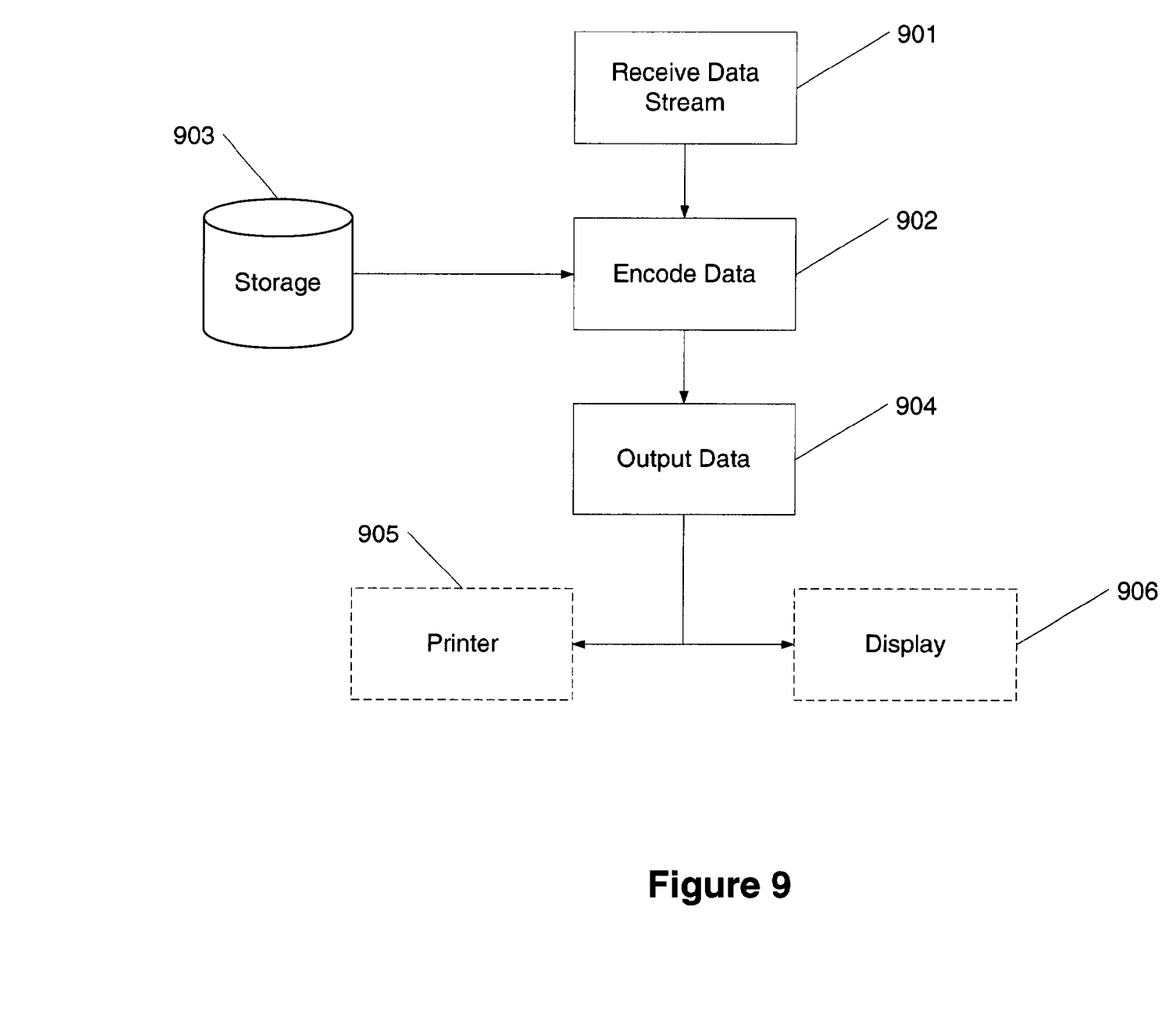
FIG. 9 shows a process for encoding data in accordance with embodiments of the present invention.

FIG. 9 shows a process for encoding a data stream using a stored scheme. In step 901 a data stream is received by a processor. In step 902, the data stream is encoded with the bit representations from storage 903. Next, the processor outputs the resultant image as output 904. The output may then be optionally printed in step 905 or may be optionally displayed on a display in step 906. To be associated with a page to be printed in step 905 or a display in step 906, the resultant image may be rendered in graphical form and sent to the printer (step 905) as an image to be printed or overlaid onto another image or document content. Similarly, the resultant image may be combined with other information and rendered for display in step 906. The process of associating the rendered form of the resultant image with other content may generally be referred to as watermarking. For instance, the image may be displayed as a watermark on the display or may be encoded into the display itself (for example, during the forming process of the display or applied later as a transparent layer).

Applications

The coding system described herein may be used in a number of ways. First, the coding system may be incorporated into printed paper as an image combined with an existing image or as an image printed on paper. The image representing the coding system may be printed on blank sheets of paper or may be added to other sheets with other information (for example, forms). The process for adding the image with the embedded information may include watermarking a document or page. This may include photocopying a watermark onto an image, printing paper with the embedded watermark, combining the watermark with another image and printing together, and various combinations thereof. Also, the coded information used by the system may also be incorporated within a transparent sheet laid over the display screen of a device or system or incorporated within a surface that may be used in combination with a display, including protective films.

In one example, one may embed the coding system into a liquid crystal display. As is known in the LCD art, each pixel pitch of LCD has its frame, and the frames of whole LCD pixels may be pieced together to a grid. Adding the presently described system permits one to add the encoded information on the grid. One may apply a film to the grid in which the film contains the encoded information. The film may provide adjusted to provide the information in visible light, provide the information in a film that selectively absorbs IR light, or provide the information in a film that fluoresces under various light wavelengths. Further, the LCD may be controlled to emit or absorb light to project the information pattern to a pen or camera.

For example, an IR reflective film with specific spectrum such as 800-900 nm may be placed on the LCD grid, with the film having encoded information. Next, the pen with an IR diode and camera (which may have an IR filter) may capture IR images as the pen moves across the LCD surface. In this instance, only the patterns on the LCD grid reflect the specific infrared light, such as 800-900 nm. So the pattern in IR image can be distinguished from other areas. The IR image can be processed and decoded to determine the location of the pen tip.

The size of a pattern may be selected according to lens design parameters and resolution requirements. For example, to achieve a 0.213 mm×0.213 mm pixel pitch and 5 mm*5 mm lens field of view of the camera, the pattern size may be set to 2*2 pixels, where each 2*2 pixel contains a code.

The coding system may be embodied in the monitor of a laptop, in the monitor of a tablet/stylus-based input computer, in the monitor of a personal data assistant, a monitor of a telephone, or any device with a display.

Another application includes associating a document identification with a document. Commonly, one may print a document's title or reference number on a document. One may print an encoded version of a document's reference number or other information (generally referred to as a document identifier) in a portion of the document (for example, in a corner). One may then capture the document number encoded image with the pen's camera, decode the encoded image to obtain the document number, then associate the annotations to be received with the document identified by the document number.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

We claim:

1. A system comprising:
   an input for receiving a bit stream;
   a storage having a graphical pattern representing a bit and another graphical pattern representing another bit, wherein the graphical patterns are comprised of dark and light pixels;
   a processor for encoding the bit stream into an encoded bit stream using the graphical patterns, said encoded bit stream corresponding to an overall graphical pattern, wherein the overall graphical pattern is configured to eliminate a type of shape by juxtaposing together the graphical patterns representing the bits; and,
   an output for outputting the encoded bit stream as the overall graphical pattern, wherein the overall graphical pattern comprises orientation information to recover a location of a captured image with respect to the overall graphical pattern, the captured image being a copy of a portion of the overall graphical pattern, wherein the orientation information is found by rotating the captured image until determining a lack of the type of shape within the captured image, the lack of the type of shape indicating an orientation from which the encoded bit stream can be decoded.

2. The system according to claim 1, wherein said output is a paper printer.

3. The system according to claim 1, wherein said output is a computer display.

4. The system according to claim 1, wherein one of said graphical patterns is a bar of dark pixels.

5. The system according to claim 1, wherein one of said graphical patterns is an bar of irregularly alternating dark and light pixels.

6. The system according to claim 1, wherein one of said graphical patterns is at least two bars of alternating dark and light pixels.

7. The system of claim 1, wherein the type of shape is a top left corner.

8. The system according to claim 1, wherein the overall graphical pattern is a single maze pattern.

9. The system according to claim 1, wherein the output is further configured for outputting the pattern with a document.

10. A method comprising:
    receiving a bit stream;
    maintaining a graphical pattern representing a bit and another graphical pattern representing another bit;
    encoding with a processor the bit stream using the graphical patterns into an encoded bit stream, the encoded bit stream corresponding to an overall graphical pattern, wherein the overall pattern is configured to eliminate a type of shape by juxtaposing together the graphical patterns representing the bits to form the overall graphical pattern; and
    outputting to a memory the encoded bit stream as the overall graphical pattern, wherein the overall graphical pattern comprises orientation information to recover a location of a captured image with respect to a portion of the overall graphical pattern, wherein the orientation information is found by rotating the captured image until determining a lack of the type of shape within the captured image, the lack of the type of shape indicating an orientation from which the encoded bit stream can be decoded.

11. The method of claim 10 further comprising associating the encoded bit stream with a document.

12. The method of claim 11 further comprising printing the pattern onto the document.

13. The system according to claim 1, wherein the portion of the overall graphical pattern is not the entirety of the overall graphical pattern.

14. The method of claim 10, wherein the portion of the overall graphical pattern is not the entirety of the overall graphical pattern.

15. The system according to claim 1, wherein the orientation information enables at least a portion of a rotation amount to be determined.

16. The method of claim 10, wherein the orientation information enables at least a portion of a rotation amount to be determined.

17. The system of claim 1, wherein the orientation information comprises the type of shape eliminated from the pattern.

18. The method of claim 10, wherein the orientation information comprises the type of shape eliminated from the pattern.

19. A system comprising:
means for receiving a bit stream;
means for maintaining a graphical pattern representing a bit and another graphical pattern representing another bit, wherein the graphical patterns are comprised of a bar of alternating dark and light pixels;
means for encoding the bit stream into an encoded bit stream corresponding to an overall graphical pattern using the graphical patterns, wherein the overall graphical pattern is configured to eliminate a type of shape by juxtaposing together the graphical patterns representing the bits to form the overall graphical pattern, the encoded bit stream comprising orientation information to recover a location of a captured image with respect to the overall graphical pattern, wherein the orientation information is found by rotating the captured image until determining a lack of a shape within the captured image, the lack of the shape indicating an orientation from which the encoded bit stream can be decoded; and
means for outputting the encoded bit stream as the overall graphical pattern.

* * * * *